United States Patent
Watanabe et al.

(10) Patent No.: US 12,163,681 B2
(45) Date of Patent: Dec. 10, 2024

(54) AIR-CONDITIONING APPARATUS

(71) Applicant: Mitsubishi Electric Corporation, Tokyo (JP)

(72) Inventors: Kazuya Watanabe, Tokyo (JP); Shohei Ishimura, Tokyo (JP); Mizuo Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 259 days.

(21) Appl. No.: 17/915,481

(22) PCT Filed: May 14, 2020

(86) PCT No.: PCT/JP2020/019248
§ 371 (c)(1),
(2) Date: Sep. 29, 2022

(87) PCT Pub. No.: WO2021/229748
PCT Pub. Date: Nov. 18, 2021

(65) Prior Publication Data
US 2023/0121703 A1    Apr. 20, 2023

(51) Int. Cl.
F24F 11/46  (2018.01)
F24F 1/38   (2011.01)
F24F 11/61  (2018.01)

(52) U.S. Cl.
CPC ............ F24F 11/46 (2018.01); F24F 1/38 (2013.01); F24F 11/61 (2018.01)

(58) Field of Classification Search
CPC .. F24F 11/46; F24F 11/61; F24F 11/77; F24F 1/38; Y02B 30/70
See application file for complete search history.

(56) References Cited

U.S. PATENT DOCUMENTS

| | | | | |
|---|---|---|---|---|
| 10,508,849 B2 * | 12/2019 | Yamakawa | ............ | F25B 49/02 |
| 2015/0330644 A1* | 11/2015 | Jeung | ...................... | F24F 11/70 |
| | | | | 62/186 |
| 2019/0271494 A1* | 9/2019 | Morimoto | ............... | F25B 39/04 |

FOREIGN PATENT DOCUMENTS

| JP | 6-26697 A | 2/1994 |
|---|---|---|
| JP | 2003-232557 A | 8/2003 |

(Continued)

OTHER PUBLICATIONS

Machine translation of JP2019066050A. (Year: 2019).*

(Continued)

*Primary Examiner* — Marc E Norman
(74) *Attorney, Agent, or Firm* — XSENSUS LLP

(57) ABSTRACT

An air-conditioning apparatus includes a compressor, an outdoor fan, and a controller configured to perform a fan intermittent operation for causing the outdoor fan to run and stop repeatedly after the compressor stops. The controller is configured to, in the fan intermittent operation, in a case where the outdoor fan is running and there is no snow accumulation on the outdoor fan, change a stop upper limit time for the outdoor fan depending on a running time of the outdoor fan in the fan intermittent operation and cause the outdoor fan to stop running after changing the stop upper limit time for the outdoor fan. The controller is configured to, in a case where a stop time of the outdoor fan exceeds the changed stop upper limit time, cause the outdoor fan to run.

8 Claims, 9 Drawing Sheets

(56) References Cited

FOREIGN PATENT DOCUMENTS

| | | | |
|---|---|---|---|
| JP | 2014-190567 | A | 10/2014 |
| JP | 2016-156515 | A | 9/2016 |
| JP | 2019-66050 | A | 4/2019 |

OTHER PUBLICATIONS

International Search Report and Written Opinion mailed on Jul. 28, 2020, received for PCT Application PCT/JP2020/019248, filed on May 14, 2020, 9 pages including English Translation.

* cited by examiner

AIR-CONDITIONING APPARATUS

CROSS-REFERENCE TO RELATED APPLICATION

The present application is based on PCT filing PCT/JP2020/019248, filed May 14, 2020, the entire contents of which are incorporated herein by reference.

TECHNICAL FIELD

The present disclosure relates to an air-conditioning apparatus performing a fan intermittent operation.

BACKGROUND ART

In a heat-pump air-conditioning apparatus, an outdoor unit including an outdoor fan and an outdoor heat exchanger is installed outdoors to absorb heat of air. In the case where it snows when the outdoor fan has stopped, if the amount of snow accumulation on the outdoor fan increases, the weight balance of the outdoor fan will be affected. If the outdoor fan resumes operation in this state, the outdoor fan may be in contact with a peripheral structure such as a bell mouth and may be damaged. Furthermore, snow that has accumulated on the outdoor fan freezes between the outdoor fan and the structure, and icicles are formed. When the outdoor fan resumes operation, contact between the outdoor fan and an icicle may cause scraping and damage to the outdoor fan.

Thus, a technique for preventing snow accumulation on the outdoor fan by causing the outdoor fan to perform a fan intermittent operation at regular intervals even when a compressor is not running has been suggested (see, for example, Patent Literature 1). In the technique described in Patent Literature 1, an air-conditioning apparatus performs a fan intermittent operation for detecting outside air temperature and forcibly driving the outdoor fan at regular intervals when the outside air temperature is low.

CITATION LIST

Patent Literature

Patent Literature 1: Japanese Unexamined Patent Application Publication No. 2003-232557

SUMMARY OF INVENTION

Technical Problem

However, in the technique disclosed in Patent Literature 1, even in the case where there is no snow accumulation on the outdoor fan and the air-conditioning apparatus does not need to perform the fan intermittent operation, whenever the outside air temperature is low, the air-conditioning apparatus operates the outdoor fan at regular intervals.

Thus, known air-conditioning apparatuses have a problem of wasteful power consumption by an intermittent operation of an outdoor fan performed after a compressor has stopped.

In light of the above circumstances, an object of the present disclosure is to provide an air-conditioning apparatus capable of reducing power consumption of a fan intermittent operation of an outdoor fan performed after a compressor has stopped.

Solution to Problem

An air-conditioning apparatus according to an embodiment of the present disclosure includes a compressor, an outdoor fan, and a controller configured to perform a fan intermittent operation for causing the outdoor fan to run and stop repeatedly after the compressor stops. The controller is configured to, in the fan intermittent operation, in a case where the outdoor fan is running and there is no snow accumulation on the outdoor fan, change a stop upper limit time for the outdoor fan depending on a running time of the outdoor fan in the fan intermittent operation and cause the outdoor fan to stop running after changing the stop upper limit time for the outdoor fan. The controller is configured to, in a case where a stop time of the outdoor fan exceeds the changed stop upper limit time, cause the outdoor fan to run.

Advantageous Effects of Invention

According to an embodiment of the present disclosure, in the case where there is no snow accumulation on the outdoor fan, the controller changes the stop upper limit time for the outdoor fan depending on the running time of the outdoor fan in the fan intermittent operation and causes the outdoor fan to stop running. In the case where the stop time of the outdoor fan exceeds the changed stop upper limit time, the controller causes the outdoor fan to run. Thus, in the case where there is no snow accumulation, the working time of the outdoor fan is short, and there is a low risk of damage to the outdoor fan, the controller is configured to increase the stop upper limit time for the outdoor fan. Therefore, the power consumption of the air-conditioning apparatus is reduced.

DESCRIPTION OF EMBODIMENTS

Figure 1:
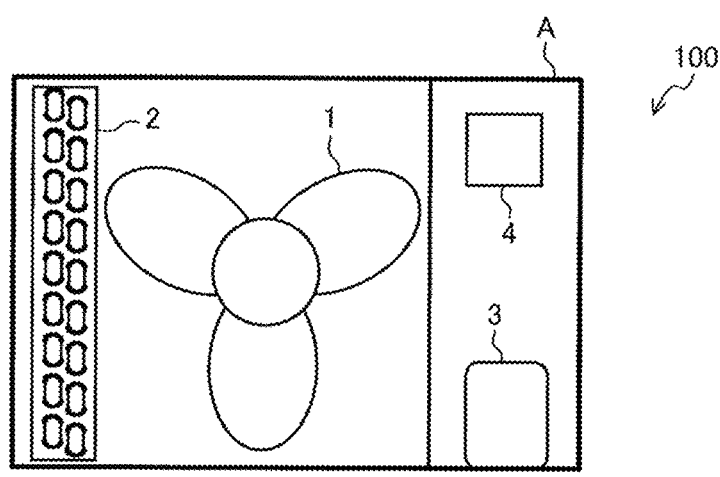
FIG. 1 is a schematic diagram of the inside of an outdoor unit of an air-conditioning apparatus according to Embodiment 1 when the outdoor unit is viewed from the front.

Hereinafter, air-conditioning apparatuses according to embodiments are described below with reference to drawings. In the drawings, the same component elements are referred to with the same reference signs, and repetitive explanation is given only when needed. The present disclosure may include any possible combinations of the configurations described in embodiments described below.

Embodiment 1

FIG. 1 is a schematic diagram of the inside of an outdoor unit A of an air-conditioning apparatus 100 according to Embodiment 1 when the outdoor unit A is viewed from the front. The outdoor unit A includes an outdoor fan 1, an outdoor heat exchanger 2, a compressor 3, and a controller 4.

The outdoor heat exchanger 2 is connected to the compressor 3 and an indoor unit, which is not illustrated in the drawing, by a refrigerant pipe.

The compressor 3 compresses refrigerant flowing through the refrigerant pipe. The outdoor fan 1 sends air for heat exchange. The controller 4 controls the entire outdoor unit A.

In Embodiment 1, an example of a configuration is described in which a single outdoor fan 1 is mounted on a single outdoor unit A. However, the number of outdoor fans 1 is not necessarily one. Two outdoor fans 1 or three or more outdoor fans 1 may be mounted. Furthermore, the outdoor fan 1 does not necessarily blow air to the front of the outdoor unit A (in the horizontal direction) but may blow air to the top of the outdoor unit A (in the upward direction).

Furthermore, an example of a configuration is described in which the compressor 3 and the controller 4 are mounted on the outdoor unit A. However, the compressor 3 and the controller 4 are not necessarily mounted on the outdoor unit A but may be installed indoors.

Figure 2:
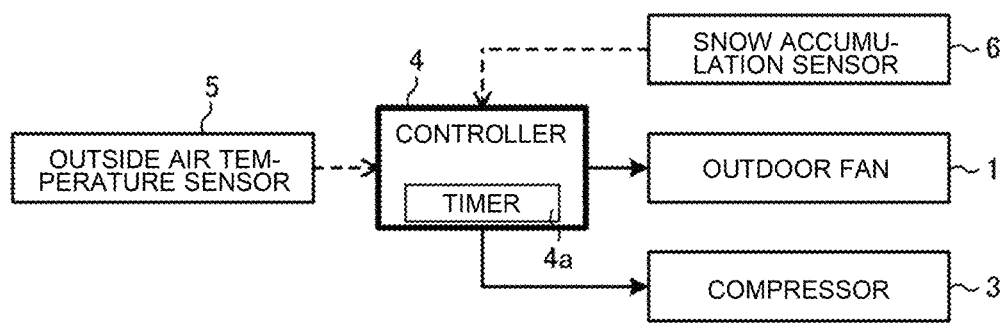
FIG. 2 is a diagram illustrating a configuration of a control system of the air-conditioning apparatus according to Embodiment 1.

FIG. 2 is a diagram illustrating a configuration of a control system of the air-conditioning apparatus 100 according to Embodiment 1.

The controller 4 includes a central processing unit (may also be called a CPU, a central processor, a processing unit, an arithmetic unit, a microprocessor, a microcomputer, or a processor) that executes a program stored in dedicated hardware or a memory.

In the case where the controller 4 is dedicated hardware, for example, a single circuit, a composite circuit, an application specific integrated circuit (ASIC), a field programmable gate array (FPGA), or a combination of these mentioned corresponds to the controller 4. Functional units implemented by the controller 4 may be implemented by individual pieces of hardware or may be implemented by a single piece of hardware.

In the case where the controller 4 is a CPU, functions executed by the controller 4 may be implemented by software, firmware, or a combination of software and firmware. Software and firmware are described as a program and stored in a memory. The CPU implements functions of the controller 4 when reading and executing a program stored in the memory. The memory is, for example, a nonvolatile or volatile semiconductor memory such as a RAM, a ROM, a flash memory, an EPROM, and an EEPROM.

Part of the functions of the controller 4 may be implemented by dedicated hardware and part of the functions may be implemented by software or firmware.

The controller 4 includes a timer 4a. The timer 4a measures the running time and the stop time of the outdoor fan 1 in a fan intermittent operation mode. The fan intermittent operation mode represents a mode in which the outdoor fan 1 runs and stops repeatedly after the compressor 3 has stopped.

The controller 4 is connected to an outside air temperature sensor 5 and a snow accumulation sensor 6 by a signal line. Information from the outside air temperature sensor 5 and the snow accumulation sensor 6 is input to the controller 4. The controller 4 is connected to the outdoor fan 1 and the compressor 3 by a signal line. The controller 4 outputs a control signal to the outdoor fan 1 and the compressor 3 through the signal line. Specifically, the controller 4 controls the rotation frequency of the outdoor fan 1 and the operating frequency of the compressor 3 depending on an operation mode set for the air-conditioning apparatus 100

The outside air temperature sensor 5 detects the outside air temperature.

The snow accumulation sensor 6 detects the state of snow accumulation on the outdoor fan 1. For example, the snow accumulation sensor 6 includes a camera capable of recognizing an image of the external appearance of the outdoor fan 1, and detects the thickness and distribution of snow accumulation from the image captured by the camera.

The snow accumulation sensor 6 may include a weight sensor capable of detecting the weight of the outdoor fan 1. The snow accumulation sensor 6 may detect the difference between the weight of the outdoor fan 1 detected by the weight sensor and the weight of the outdoor fan 1 on which no snow has accumulated, and thus may detect the snow accumulation state.

The snow accumulation sensor 6 may include an optical sensor capable of determining color by detecting light reflected on the surface of the outdoor fan 1 and a light source. The snow accumulation sensor 6 may detect the snow accumulation state by detecting a white region where snow has accumulated on a non-white surface of the outdoor fan 1.

In addition, the snow accumulation sensor 6 may include a motive power sensor capable of detecting the shaft power of the outdoor fan 1. Snow accumulation on the outdoor fan 1 increases weight and thus increases the shaft power detected by the motive power sensor. The snow accumulation sensor 6 detects the snow accumulation state by detecting the difference between the increased shaft power and a shaft power with no snow accumulation.

Next, operation characteristics of various operations performed by the air-conditioning apparatus 100 according to Embodiment 1 are described below.

The air-conditioning apparatus 100 operates in two types of operation modes, a heating operation and a fan intermittent operation.

During a heating operation, the controller 4 causes both the outdoor fan 1 and the compressor 3 to operate. By causing the compressor 3 to operate, the controller 4 changes low-temperature and low-pressure gas refrigerant into high-temperature and high-pressure gas refrigerant, sends the high-temperature and high-pressure gas refrigerant out of the outdoor unit A to an indoor unit, heats indoor air, and thus performs heating. At this time, in the indoor unit, the high-temperature and high-pressure gas refrigerant is cooled down by the indoor air and turns into low-temperature liquid refrigerant.

By adjusting the valve opening degree of a pressure-reducing device, which is not illustrated in the drawing, the controller 4 changes the liquid refrigerant into low-temperature and low-pressure two-phase refrigerant, and causes the two-phase refrigerant to flow into the outdoor heat exchanger 2. By causing the outdoor fan 1 to run, the controller 4 accelerates heat exchange between outdoor air and refrigerant at the outdoor heat exchanger 2. The controller 4 thus heats the two-phase refrigerant by outdoor air so that the two-phase refrigerant turns into low-temperature and low-pressure gas refrigerant. The gas refrigerant returns to the compressor 3, and the refrigerant turns into a state in which the refrigerant is usable for heating again.

The outdoor fan 1 is operating during a heating operation, and snow thus does not accumulate on the outdoor fan 1 even when it is snowing. Thus, there is no risk of damage to the outdoor fan 1.

When the heating operation has stopped, the controller 4 does not need to send refrigerant to the indoor unit. Thus, the controller 4 stops the compressor 3. Furthermore, outdoor air and refrigerant do not need to exchange heat, and the controller 4 thus also stops the outdoor fan 1. When the outdoor fan 1 has stopped, snow may accumulate on the outdoor fan 1, and the outdoor fan 1 may be damaged. Thus, the controller 4 performs a fan intermittent operation for preventing snow accumulation on the outdoor fan 1.

During a fan intermittent operation the controller 4 causes the outdoor fan 1 to run and stop repeatedly. Thee controller 4 is configured to reduce snow accumulation on the outdoor fan 1 by causing the outdoor fan 1 to operate intermittently.

[Operation Performed before Fan Intermittent Operation Starts and After Fan Intermittent Operation Ends]

Figure 3:
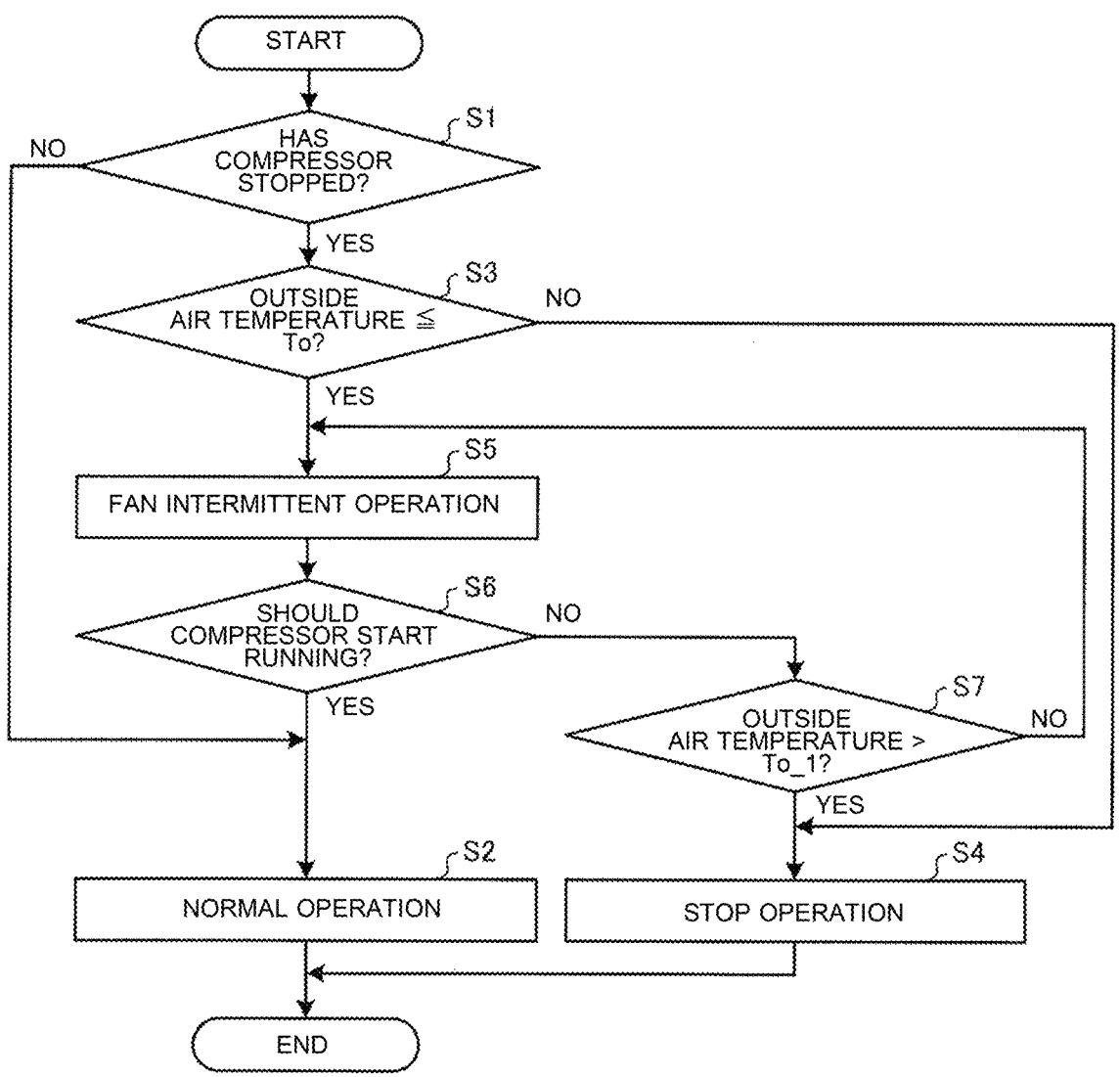
FIG. 3 is a flowchart for explaining an operation performed before a fan intermittent operation of the air-conditioning apparatus according to Embodiment 1 starts and after the fan intermittent operation ends.

FIG. 3 is a flowchart for explaining an operation performed before a fan intermittent operation of the air-conditioning apparatus 100 according to Embodiment 1 starts and after the fan intermittent operation ends.

The controller 4 determines whether or not the compressor 3 has stopped (step S1). In the case where the controller 4 determines that the compressor 3 has not stopped (NO in step S1), the controller 4 exercises normal operation control (step S2), and ends the process, In contrast, in the case where the controller 4 determines that the compressor 3 has stopped (YES in step S1), the controller 4 determines whether or not the outside air temperature is lower than or equal to a first outside air temperature threshold To for starting a fan intermittent operation (step S3).

In the case where the controller 4 determines that the outside air temperature is higher than the first outside air temperature threshold To (NO in step S3), the controller 4 stops the operation (step S4), and ends the process.

In contrast, in the case where the controller 4 determines that the outside air temperature is lower than or equal to the first outside air temperature threshold To, the controller 4 performs a fan intermittent operation (step S5). During the fan intermittent operation, the controller 4 determines whether or not the compressor 3 is to start running (step S6).

In the case where the controller 4 determines that the compressor 3 is to start running (YES in step S6), the controller 4 performs a normal operation (step S2), and ends the process.

In contrast, in the case where the controller 4 determines that the compressor 3 is not to start running (NO in step S6), the controller 4 determines whether or not the outside air temperature is higher than a second outside air temperature threshold To_1 for ending a fan intermittent operation (step S7).

In the case where the controller 4 determines that the outside air temperature is higher than the second outside air temperature threshold To_1 (YES in step S7), the controller 4 stops the operation (step S4), and ends the process.

In contrast, in the case where the controller 4 determines that the outside air temperature is lower than or equal to the second outside air temperature threshold To_1 (NO in step S7), the controller 4 continues the fan intermittent operation (step S5).

In FIG. 3, when the compressor 3 has stopped and the outside air temperature is lower than the first outside air temperature threshold To for starting a fan intermittent operation, the controller 4 immediately performs a fan intermittent operation. However, the process is not limited to the one illustrated in FIG. 3. For example, when a predetermined time has passed after the compressor 3 has stopped, the controller 4 may cause the outdoor fan 1 to perform a fan intermittent operation.

In the case where the compressor is not stopped by a users operation for stopping the operation but is stopped by a room temperature that reaches a target value, the compressor 3 may resume operation in a short period of time, and a fan intermittent operation is not highly necessary. Thus, the controller 4 may wait a predetermined time before performing a fan intermittent operation after the compressor 3 has stopped. Thus, the controller 4 prevents an unnecessary fan intermittent operation.

Furthermore, in FIG. 3, before a fan intermittent operation starts, the determination for the outside air temperature is performed in step S3 after the determination for the compressor is performed in step S1. However, the order of the determination for the compressor and the determination for the outside air temperature is not particularly limited, and the determination for the compressor may be performed after the determination for the outside air temperature is performed. The same applies to the process performed for ending the fan intermittent operation.

[Control During Fan Intermittent Operation]

Figure 4:
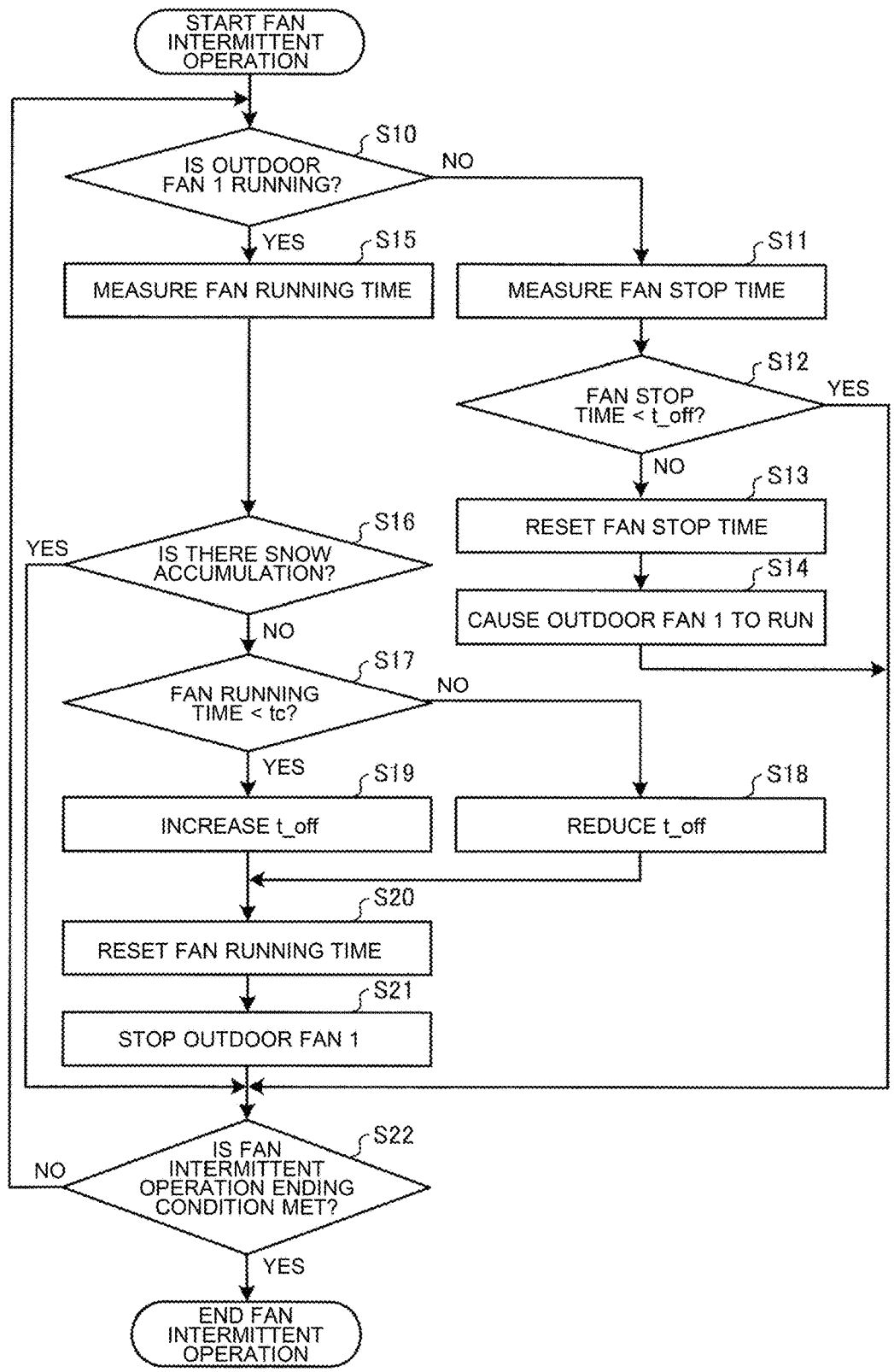
FIG. 4 is a flowchart illustrating an operation performed during the fan intermittent operation of the air-conditioning apparatus according to Embodiment 1.

FIG. 4 is a flowchart illustrating an operation performed during the fan intermittent operation of the air-conditioning apparatus 100 according to Embodiment 1. FIG. 4 specifically explains the operation of step S5 illustrated in FIG. 3.

The controller 4 determines whether or not the outdoor fan 1 is running during the fan intermittent operation (step S10). In the case where the controller 4 determines that the outdoor fan 1 is not running (NO in step S10), the controller 4 proceeds to step S11. In the case where the controller 4 determines that the outdoor fan 1 is running (YES in step S10), the controller 4 proceeds to step S1

In step S11, the controller 4 measures a fan stop time. Then, the controller 4 determines whether or not the fan stop time is shorter than a fan stop upper limit time t_off (step S12). In the case where the controller 4 determines that the fan stop time is longer than or equal to the fan stop upper limit time t_off, the controller 4 resets the fan stop time (step S13). Then, the controller 4 causes the outdoor fan 1 to run (step S14).

In the case where the controller 4 determines that the fan stop time is shorter than the fan stop upper limit time t_off (YES in step S12), the controller 4 continues the fan stop state.

In contrast, in step S15, the controller 4 measures a fan running time. Then, the controller 4 determines, on the basis of the snow accumulation state input from the snow accumulation sensor 6, whether or not there is snow accumulation on the outdoor fan 1 (step S16).

In the case where the controller 4 determines that there is no snow accumulation on the outdoor fan 1 (NO in step 16), the controller 4 determines whether or not the fan running time is shorter than a determination time tc (step S17). In the case where the controller 4 determines that the fan running time is longer than or equal to the determination time tc (NO in step S17), the controller 4 reduces the fan stop upper limit time t_off (step S18) The controller 4 may set the fan stop upper limit time t_off shorter as the fan running time is longer.

In contrast, in the case where the controller 4 determines that the fan running time is shorter than the determination time tc (YES in step S17), the controller 4 increases the fan stop upper limit time t_off (step S19). The controller 4 may set the fan stop upper limit time t_off longer as the fan running time is shorter.

After step S18 or step S19, the controller 4 resets the fan running time (step S20), and stops the outdoor fan 1 (step S21). In the case where the controller 4 determines in step S16 that there is snow accumulation on the outdoor fan 1 (YES in step S16), the controller 4 causes the outdoor fan 1 to continue running.

In the case where the result of the determination in step S16 is YES, after step S21, in the case where the result of the determination in step S12 is YES, or after step S14, the controller 4 determines whether or not a fan intermittent operation ending condition is met (step S22). Cases where the "fan intermittent operation ending condition" is met include a case where the controller 4 determines in step S6 illustrated in FIG. 3 that the compressor 3 is to start running (YES in step S6) or a case where the controller 4 determines in step S7 that the outside air temperature is higher than the second outside air temperature threshold To_1 for ending a fan intermittent operation (YES in step S7).

In the case where the controller 4 determines that the fan intermittent operation ending condition is met (YES in step S22), the controller 4 ends the fan intermittent operation. In the case where the controller 4 determines that the fan intermittent operation ending condition is not met (NO in step S22), the controller 4 returns to step S10 and continues the fan intermittent operation.

Figure 5:
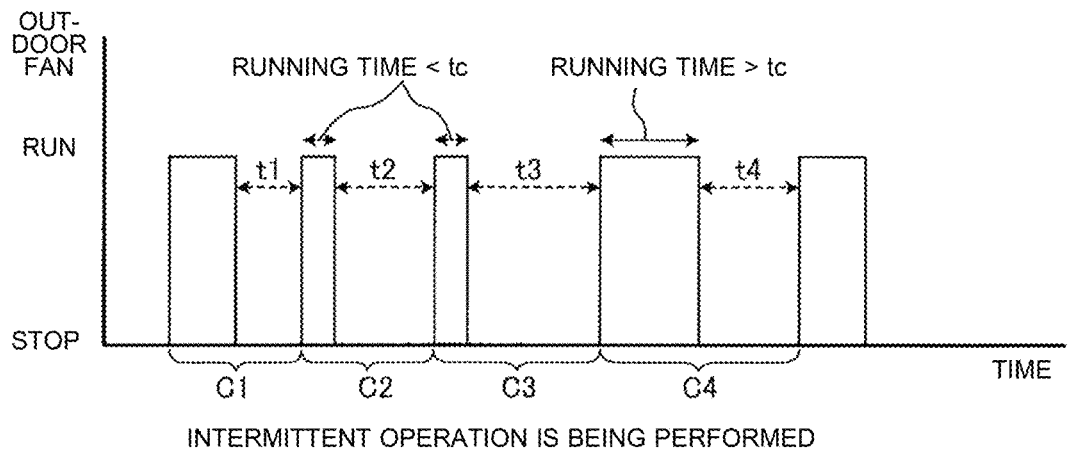
FIG. 5 is a diagram illustrating changes of a running time and a stop time of the outdoor fan for the fan intermittent operation of the air-conditioning apparatus according to Embodiment 1.

Effects of steps S16 to S19 for determining whether or not there is snow accumulation on the outdoor fan 1 and changing the fan stop upper limit time t_off depending on the fan running time are described below. FIG. 5 is a diagram illustrating changes of the running time and the stop time of the outdoor fan 1 for the fan intermittent operation of the air-conditioning apparatus 100 according to Embodiment 1.

In FIG. 5, the vertical axis represents the running state and the stop state of the outdoor fan 1, and the horizontal axis represents time. Furthermore, C1 to C4 illustrated in FIG. 5 represent the numbers of cycles of running and stop in the drawing. One cycle begins from the start of running and lasts until the end of the stop. The cycle C1 represents the first cycle, the cycle C2 represents the second cycle, C3 represents the third cycle, and C4 represents the fourth cycle. The cycle C1 represents the first cycle illustrated in FIG. 5 but is not necessarily the first cycle after a fan intermittent operation has started. Furthermore, t1, t2, t3, and t4 illustrated in FIG. 5 represent stop times in the respective cycles. The time t1 represents the stop time in the cycle C1, the time t2 represents the stop time in the cycle C2, the time t3 represents the stop time in the cycle C3, and the time t4 represents the stop time in the cycle C4.

As is clear from FIG. 5, the stop times t1, t2, t3, and t4 change depending on the running times in the cycles C1, C2, C3, and C4 during the fan intermittent operation of the air-conditioning apparatus 100. In the cycle C2, the running time is shorter than the determination time tc, and the stop time t2 in the cycle C2 is thus longer than the stop time t1 in the cycle C1. Also in the cycle C3, the running time is shorter than the determination time tc, and the stop time t3 in the cycle C3 is thus longer than the stop time t2 in the cycle C2. In contrast, the running time in the cycle C4 is longer than the determination time tc, and the stop time t4 in the cycle C4 is thus shorter than the stop time t3 in the cycle C3.

As described above, by determining whether the fan is to continue running or stop depending on whether or not there is snow accumulation, the fan running time changes depending on the snow accumulation state, and the fan running time is likely to be short when the amount of snowfall is small and the amount of snow accumulation on the fan is thus small. In this case, snow is less likely to accumulate again after the fan has stopped. Thus, by increasing the fan stop time, unnecessary running of the fan is reduced, and power consumption is thus reduced.

In FIG. 4, a single determination time tc is used, and the fan stop upper limit time t_off is reduced or increased depending on the relationship between the fan running time and the determination time tc in steps S17 to S19. However, in processing from step S17 to step S19, a step in which the fan stop upper limit time t_off is not changed may be provided. For example, a determination time tc1 and a determination time tc2 are provided, where tc1 is shorter than tc2, In the case where the fan running time is shorter than or equal to the determination time tc1, the controller 4 increases the fan stop upper limit time t_off. In the case where the fan running time is longer than or equal to the determination time tc2, the controller 4 reduces the fan stop upper limit time t_off. In the case where the fan running time is between the determination time tc1 and the determination time tc2, the controller 4 does not change the fan stop upper limit time t_off.

Furthermore, a plurality of determination times tc may be provided, and the controller 4 may vary the variation range of decrease or increase for the fan stop upper limit time t_off. For example, the determination time tc1 and the determination time tc2 are provided, where tc1 is shorter than tc2, In the case where the fan running time is shorter than or equal to the determination time tc1, the controller 4 increases the fan stop upper limit time t_off. In the case where the fan running time is longer than the determination time tc1, the controller 4 reduces the fan stop upper limit time t_off. In the case where the fan running time is longer than or equal to the determination time tc2, the controller 4 increases the decrease range for the fan stop upper limit time t_off compared to the case where the fan running time is between the determination time tc1 and the determination time tc2.

In place of steps S17 to S19, a calculation step for calculating the fan stop upper limit time t_off on the basis of the fan running time may be provided. By using a mathematical expression for setting the fan stop upper limit time t_off shorter as the fan running time is longer, effects similar to those obtained in steps S17 to S19 are achieved.

Furthermore, in FIG. 4, after the fan running time is measured in step S15, whether or not there is snow accumulation is determined in step S16. However, the order of the measuring of the fan running time and the determining whether or not there is snow accumulation is not particularly limited. An order may be set such that, after whether or not there is snow accumulation is determined and the fan is determined to continue running, the fan running time is measured. The same applies to measuring of the fun stop time. After the fan stop state is determined to continue, the fan stop time may be measured.

Furthermore, at the time when the fan intermittent operation starts, before step S10 illustrated in FIG. 4, a step for specifying stop or running of the outdoor fan 1 may be added.

Embodiment 2

Figure 6:
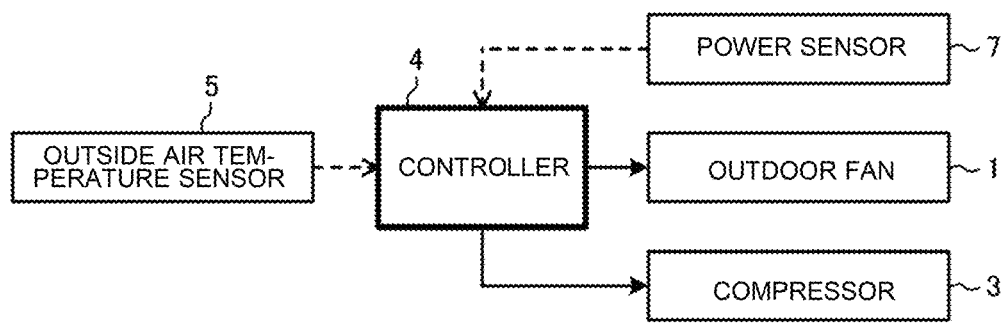
FIG. 6 is a diagram illustrating a configuration of a control system of an air-conditioning apparatus according to Embodiment 2.

FIG. 6 is a diagram illustrating a configuration of a control system of the air-conditioning apparatus 100 according to Embodiment 2.

Parts of the air-conditioning apparatus 100 according to Embodiment 2 that are different from those in Embodiment 1 are mainly described below, and detailed explanation for configurations and operations similar to those in Embodiment 1 is omitted.

The control system of the air-conditioning apparatus 100 according to Embodiment 2 includes a power sensor 7 in place of the snow accumulation sensor 6 of the air-conditioning apparatus 100 according to Embodiment 1 illustrated in FIG. 2. The power sensor 7 is configured to detect consumption power of the outdoor fan 1.

In the air-conditioning apparatus 100 according to Embodiment 2, consumption power of the outdoor fan 1 detected by the power sensor 7 is used to determine whether the fan is to continue running or stop during a fan intermittent operation. In the case where there is snow accumulation on the outdoor fan 1, the weight of the outdoor fan 1 increases. Thus, the motive power necessary for operating the outdoor fan 1 at the same rotation frequency increases. Therefore, compared to the case where there is no snow accumulation, the consumption power of the outdoor fan 1 increases. Thus, by causing the power sensor 7 to detect an increase in the consumption power, whether or not there is snow accumulation on the outdoor fan 1 is determined.

[Control During Fan Intermittent Operation]

Figure 7:
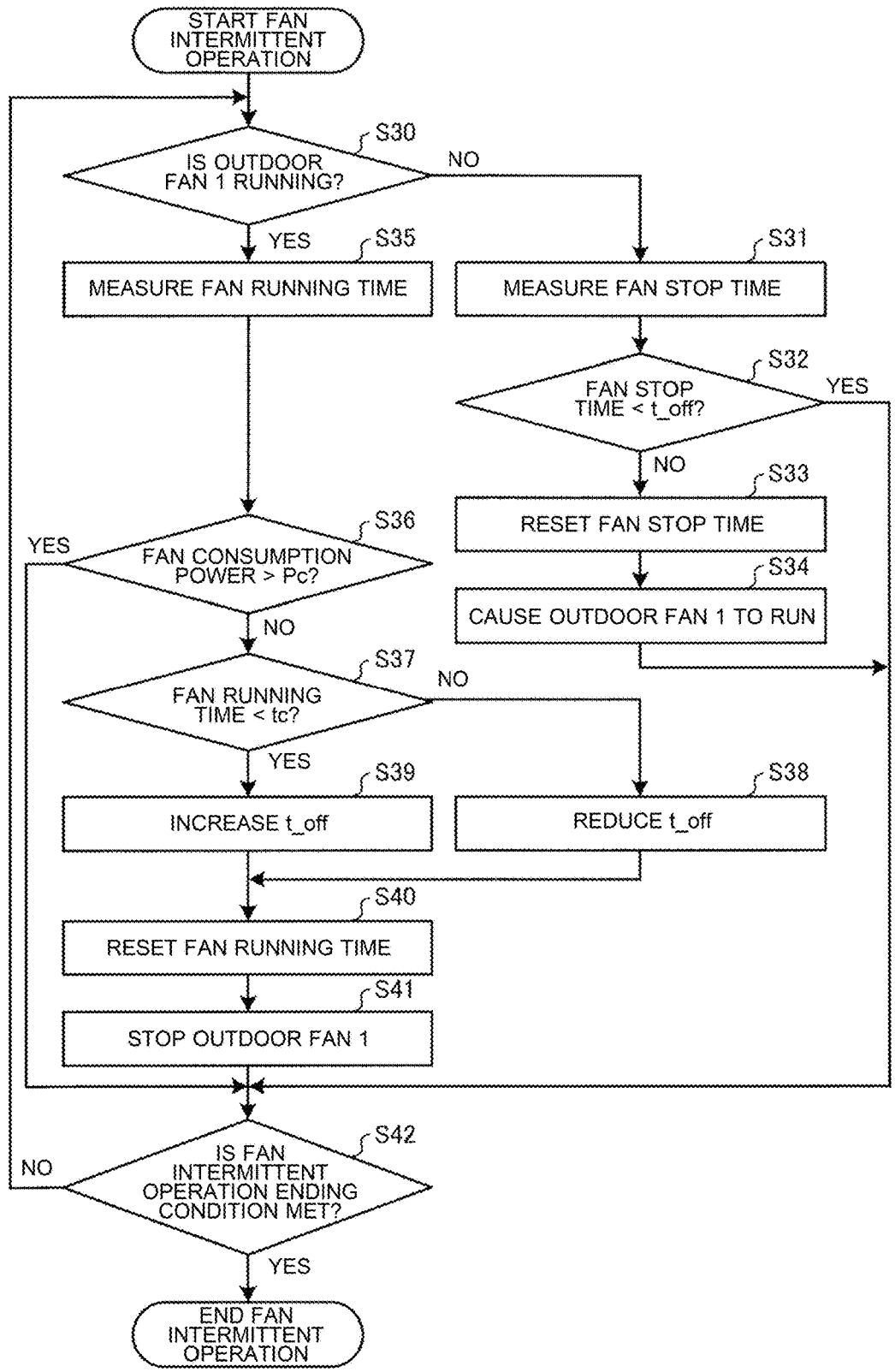
FIG. 7 is a flowchart illustrating an operation performed during a fan intermittent operation of the air-conditioning apparatus according to Embodiment 2.

FIG. 7 is a flowchart illustrating an operation performed during a fan intermittent operation of the air-conditioning apparatus 100 according to Embodiment 2. Parts different from the flowchart for the operation performed during the fan intermittent operation according to Embodiment 1 described above are described below.

Steps S30 to S35 are the same as steps S10 to S15 illustrated in FIG. 4. After step S35, the controller 4 determines whether or not the consumption power of the outdoor fan 1 detected by the power sensor 7 is more than a consumption power determination value Pc (step S36). In the case where the controller 4 determines that the consumption power of the outdoor fan 1 is less than or equal to the consumption power determination value Pc (NO in step S36), the controller 4 determines whether or not the fun running time is shorter than the determination time tc (step S37). Steps S37 to S41 are the same as steps S17 to S21 illustrated in FIG. 4. In steps S37 to S39, the controller 4 changes the fan stop upper limit time t_off depending on the fun running time. Next, the controller 4 resets the fun running time (step S40), and stops the outdoor fan 1 (step S41).

In contrast, in the case where the controller 4 determines in step S36 that the consumption power of the outdoor fan 1 is more than the consumption power determination value Pc (YES in step S36), the controller 4 causes the fun to continue running.

The controller 4 determines, by use of the determination in step S36 as to he relationship between the consumption power of the outdoor fan 1 and the consumption power determination value Pc, whether the outdoor fan 1 is to continue running or stop. Thus, the fan running time of the outdoor fan 1 varies, and effects similar to those obtained in steps S17 to S19 for changing the fan stop upper limit time t_off in Embodiment 1 are achieved.

Step S42 is the same as step S22 illustrated in FIG. 4.

The consumption power of the outdoor fan 1 varies depending on the rotation frequency. Thus, by changing the consumption power determination value Pc depending on the rotation frequency, a more accurate determination is achieved. Furthermore, the consumption power differs depending on the installation state of the outdoor unit A even with the same rotation frequency. By detecting the consumption power during a heating operation and changing the consumption power determination value Pc depending on the value of the consumption power, a more accurate determination is thus achieved.

Embodiment 3

Figure 8:
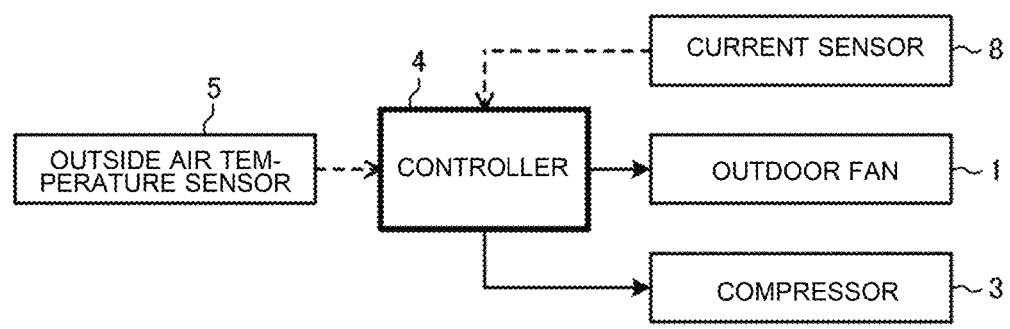
FIG. 8 is a diagram illustrating a configuration of a control system of an air-conditioning apparatus according to Embodiment 3.

FIG. 8 is a diagram illustrating a configuration of a control system of the air-conditioning apparatus 100 according to Embodiment 3.

Parts of the air-conditioning apparatus 100 according to Embodiment 3 that are different from those in Embodiment 1 are mainly described below, and detailed explanation for configurations and operations similar to those in Embodiment 1 is omitted.

The control system of the air-conditioning apparatus 100 according to Embodiment 3 includes a current sensor 8 in place of the snow accumulation sensor 6 of the air-conditioning apparatus 100 according to Embodiment 1 illustrated in FIG. 2. The current sensor 8 is configured to detect current flowing to the outdoor fan 1.

In the air-conditioning apparatus 100, current flowing to the outdoor fan 1 detected by the current sensor 8 is used to determine whether the outdoor fan 1 is to continue running or stop during a fan intermittent operation. In the case where there is snow accumulation on the outdoor fan 1, the weight of the outdoor fan 1 increases. Thus, the motive power necessary for the controller 4 to operate the outdoor fan 1 at the same rotation frequency increases. Therefore, compared to the case where there is no snow accumulation, current in the outdoor fan 1 at the same rotation frequency increases. The current sensor 8 detects current to the outdoor fan 1. The controller 4 determines whether or not there is snow accumulation on the outdoor fan 1 by use of the current to the outdoor fan 1 detected by the current sensor 8.

[Control During Fan Intermittent Operation]

Figure 9:
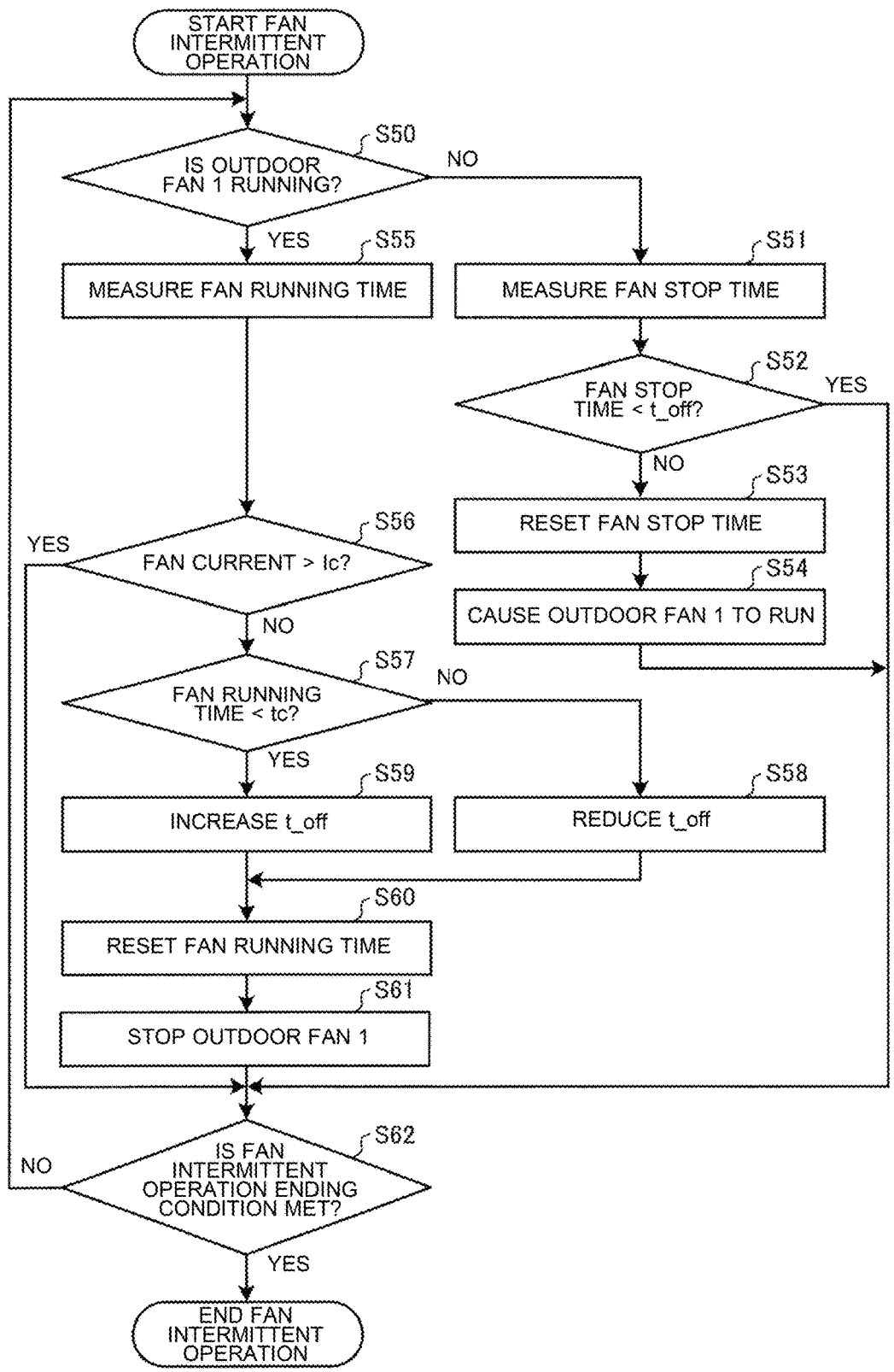
FIG. 9 is a flowchart illustrating an operation performed during a fan intermittent operation of the air-conditioning apparatus according to Embodiment 3.

FIG. 9 is a flowchart illustrating an operation performed during a fan intermittent operation of the air-conditioning apparatus 100 according to Embodiment 3. Parts different from the operation performed during the fan intermittent operation according to Embodiment 2 described above are described below.

Steps S50 to S55 are the same as steps S10 to S15 illustrated in FIG. 4. In step S56, the controller 4 determines whether or not the current in the outdoor fan 1 detected by the current sensor 8 is more than a current determination value Ic. In the case where the controller 4 determines in step S56 that the current in the outdoor fan 1 is less than or equal to the current determination value Ic (NO in step S56), the controller 4 determines whether or not the fan running time is shorter than the determination time tc (step S57). Steps S57 to S61 are the same as steps S17 to S21 illustrated in FIG. 4. In steps S57 to S59 the controller 4 changes the fan stop upper limit time t_off depending on the fan running time. The controller 4 resets the fan running time (step S60). Next, the controller 4 stops the outdoor fan 1 (step S61).

In contrast, in the case where the controller 4 determines in step S56 that the current in the outdoor fan 1 is more than the current determination value Ic (YES in step S56), the controller 4 causes the outdoor fan 1 to continue running.

The controller 4 determines, by use of the determination in step S56 as to the relationship between the current in the outdoor fan 1 and the current determination value Ic, whether the outdoor fan 1 is to continue running or stop. Thus, the fan running time of the outdoor fan 1 varies, and effects similar to those obtained in steps S17 to S19 for changing the fan stop upper limit time t_off in Embodiment 1 are achieved.

Step S62 is the same as step S22 illustrated in FIG. 4.

The current in the outdoor fan 1 varies depending on the rotation frequency. Thus, by changing the current determination value Ic depending on the rotation frequency, a more accurate determination is achieved. Furthermore, the current differs depending on the installation state of the outdoor unit A even with the same rotation. By detecting the current during a heating operation and changing the current determination value Ic depending on the value of the current, a more accurate determination is thus achieved.

Embodiment 4

Figure 10:
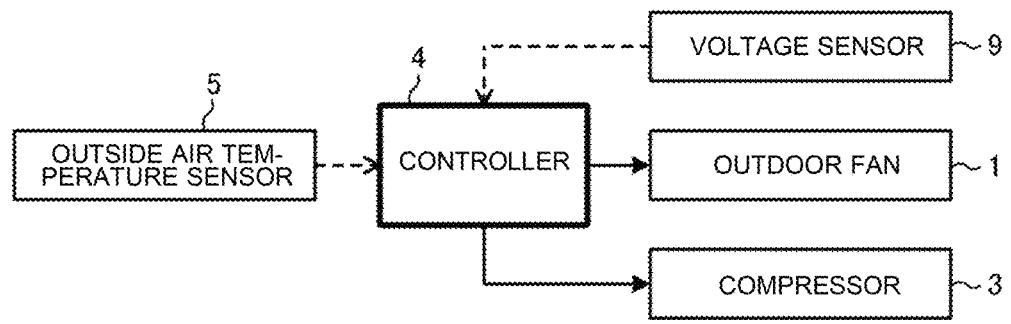
FIG. 10 is a diagram illustrating a configuration of a control system of an air-conditioning apparatus according to Embodiment 4.

FIG. 10 is a diagram illustrating a configuration of a control system of the air-conditioning apparatus 100 according to Embodiment 4.

Parts of the air-conditioning apparatus 100 according to Embodiment 4 that are different from those in Embodiment 1 are mainly described below, and detailed explanation for configurations and operations similar to those in Embodiment 1 is omitted.

The control system of the air-conditioning apparatus 100 according to Embodiment 4 includes a voltage sensor 9 in place of the snow accumulation sensor 6 of the air-conditioning apparatus 100 according to Embodiment 1 illustrated in FIG. 2. The voltage sensor 9 is configured to detect voltage applied to the outdoor fan 1.

In the air-conditioning apparatus 100, current flowing to the outdoor fan 1 detected by the current sensor 8 is used to determine whether the fan is to continue running or stop during a fan intermittent operation. In the case where there is snow accumulation on the outdoor fan 1, the weight of the outdoor fan 1 increases. Thus, the motive power necessary for the controller 4 to operate the outdoor fan 1 at the same rotation frequency increases. Therefore, compared to the case where there is no snow accumulation, the voltage of the outdoor fan 1 at the same rotation frequency increases. The controller 4 determines whether or not there is snow accumulation on the outdoor fan 1 by use of the voltage to the outdoor fan 1 detected by the voltage sensor 9.

[Control During Fan Intermittent Operation]

Figure 11:
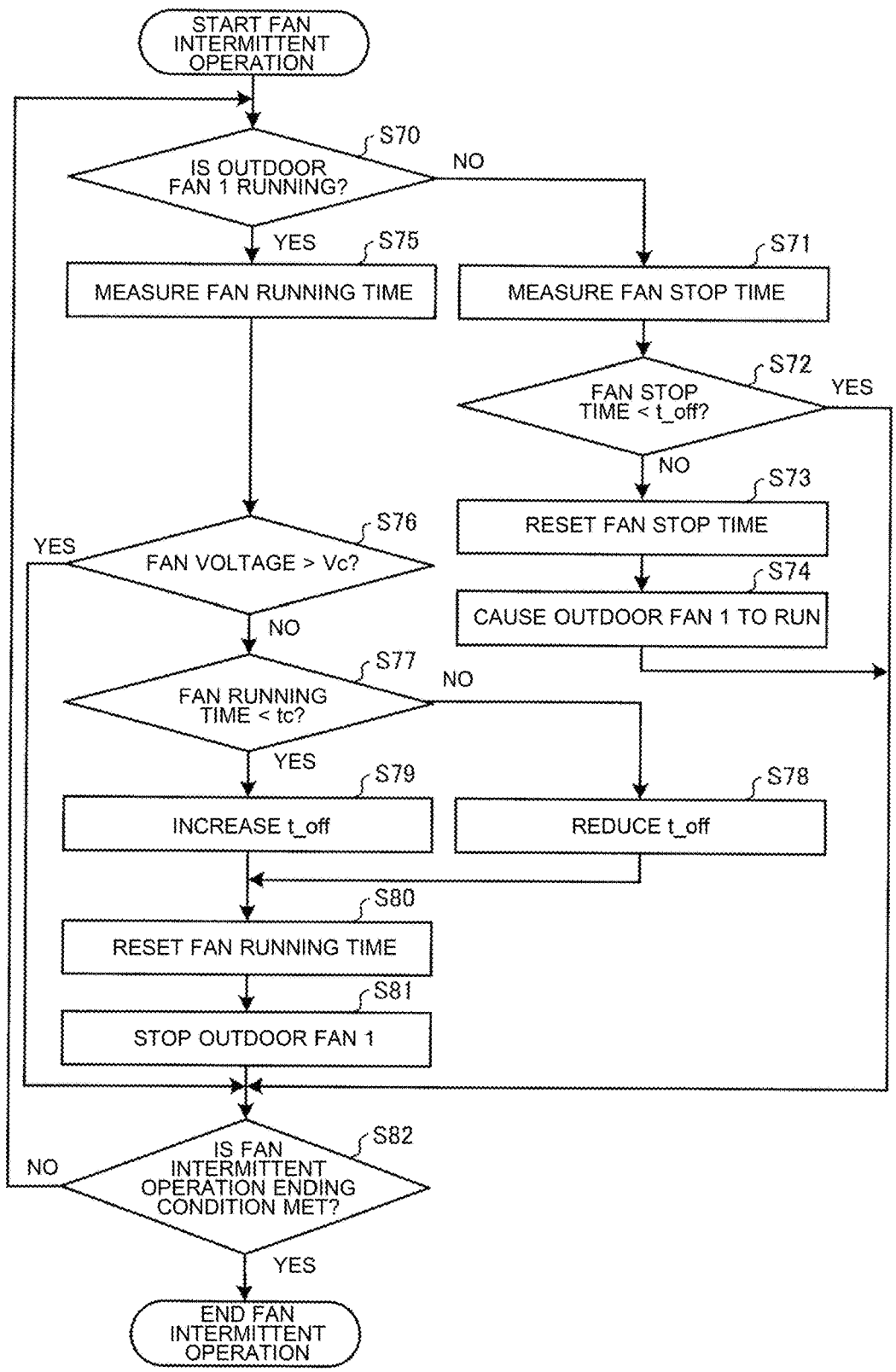
FIG. 11 is a flowchart illustrating an operation performed during a fan intermittent operation of the air-conditioning apparatus according to Embodiment 4.

FIG. 11 is a flowchart illustrating an operation performed during a fan intermittent operation of the air-conditioning apparatus 100 according to Embodiment 4. Parts different from the operation performed during the fan intermittent operation according to Embodiment 2 described above are described below.

Steps S70 to S75 are the same as steps S10 to S15 illustrated in FIG. 4. In step S76, the controller 4 determines whether or not the voltage of the outdoor fan 1 detected by the voltage sensor 9 is more than a voltage determination value Vc. In the case where the controller 4 determines in step S76 that the voltage of the outdoor fan 1 is less than or equal to the voltage determination value Vc (NO in step S76), the controller 4 determines whether or not the fan running time is shorter than the determination time to (step S77). Steps S77 to S81 are the same as steps S17 to S21 illustrated in FIG. 4. In steps S77 to S79, the controller 4 changes the fan stop upper limit time t_off depending on the fan running time. The controller 4 resets the fan running time (step S80). Next, the controller 4 stops the outdoor fan 1 (step S81).

In contrast, in the case where the controller 4 determines in step S76 that the voltage of the outdoor fan 1 is more than the voltage determination value Vc (YES in step S76), the controller 4 causes the outdoor fan 1 to continue running.

The controller 4 determines, by use of the determination in step S76 as to the relationship between the voltage of the outdoor fan 1 and the voltage determination value Vc, whether the outdoor fan 1 is to continue running or stop. Thus, the fan running time of the outdoor fan 1 varies, and effects similar to those obtained in steps S17 to S19 for changing the fan stop upper limit time t_off in Embodiment 1 are achieved.

Step S82 is the same as step S22 illustrated in FIG. 4.

(1) The air-conditioning apparatuses 100 according to Embodiment 1, Embodiment 2 Embodiment 3, and Embodiment 4 achieve effects described below.

In the case where there is no snow accumulation on the outdoor fan 1, the controller 4 changes the stop upper limit time for the outdoor fan 1 depending on the running time of the outdoor fan 1 in a fan intermittent operation and causes the outdoor fan 1 to stop running. Furthermore, in the case where the stop time of the outdoor fan 1 exceeds the changed stop upper limit time, the controller 4 causes the outdoor fan 1 to run. Thus, in the case where there is no snow accumulation, the working time of the outdoor fan 1 is short, and there is a low risk of damage to the outdoor fan 1, the controller 4 is configured to increase the stop upper limit time for the outdoor fan 1. Therefore, the power consumption of the air-conditioning apparatus 100 is reduced. Furthermore, damage to the outdoor fan 1 caused by snow accumulation or other reasons is reduced.

(2) Thee air-conditioning apparatuses 100 according to Embodiment 2, Embodiment 3, and Embodiment 4 achieve effects described below.

The controller 4 determines the state of snow accumulation by use of the consumption power of the outdoor fan 1, the current flowing in the outdoor fan 1, or the voltage applied to the outdoor fan 1. Thus, whether or not there is snow accumulation is determined at low cost compared to the case where the snow accumulation sensor 6 in Embodiment 1 is used.

The consumption power determination value Pc, the current determination value Ic, and the voltage determination value Vc are set depending on the rotation frequency of the outdoor fan 1. Thus, the controller 4 is capable of performing a more accurate determination by taking into consideration a change in the consumption power of the outdoor fan 1, the current flowing in the outdoor fan 1, or the voltage applied to the outdoor fan 1.

Furthermore, a more accurate determination is performed because a change in the consumption power of the outdoor fan 1, the current flowing in the outdoor fan 1, or the voltage applied to the outdoor fan 1 caused by installation environment of the outdoor fan 1 is taken into consideration.

Examples of the air-conditioning apparatuses 100 that perform only a heating operation and a fan intermittent operation have been described in Embodiment 1, Embodiment 2, Embodiment 3, and Embodiment 4. However, the air-conditioning apparatus 100 is not limited to the examples described above. The air-conditioning apparatus 100 according to an embodiment is also applicable to an air-conditioning apparatus 100 with a circuit configuration capable of performing a cooling operation.

Furthermore, each of the snow accumulation sensor 6, the power sensor 7, and the current sensor 8 according to an embodiment may also be referred to as a sensor.

Embodiments are presented as examples and are not intended to limit the claims. Embodiments may be implemented in various other modes and various omissions, replacements, and changes may be made to the embodiments without departing from the gist of the embodiments. These embodiments and modifications of the embodiments are included in the scope and gist of the embodiments.

REFERENCE SIGNS LIST

1: outdoor fan, 2: outdoor heat exchanger, 3 compressor, 4: controller, 4a: timer, 5: outside air temperature sensor, 6: snow accumulation sensor, 7: power sensor, 8: current sensor, 9: voltage sensor, 100: air-conditioning apparatus, A: outdoor unit, To: first outside air temperature threshold, To_1: second outside air temperature threshold, C1, C2, C3, and C4: cycle, t1, t2, t3, and t4: stop time, t_off: fan stop upper limit time, tc: determination time, Ic: current determination value

The invention claimed is:

1. An air-conditioning apparatus comprising:
a compressor;
an outdoor fan; and
a controller configured to perform a fan intermittent operation for causing the outdoor fan to run and stop repeatedly after the compressor stops,
the controller being configured to, in the fan intermittent operation, in a case where the outdoor fan is running and there is no snow accumulation on the outdoor fan, change a stop upper limit time for the outdoor fan depending on a running time of the outdoor fan in the fan intermittent operation and cause the outdoor fan to stop running after changing the stop upper limit time for the outdoor fan,
the controller being configured to, in a case where a stop time of the outdoor fan exceeds the changed stop upper limit time, cause the outdoor fan to run.

2. The air-conditioning apparatus of claim 1, further comprising a timer configured to measure the running time of the outdoor fan and the stop time of the outdoor fan in the fan intermittent operation,
wherein the controller is configured to determine the stop upper limit time for the outdoor fan depending on the running time of the outdoor fan measured by the timer.

3. The air-conditioning apparatus of claim 2, wherein the controller is configured to determine that the stop upper limit time for the outdoor fan is set longer as the running time measured by the timer is shorter.

4. The air-conditioning apparatus of claim 1, further comprising a sensor configured to detect a state of snow accumulation on the outdoor fan,
wherein the controller is configured to, in a case where the controller determines that there is snow accumulation on the outdoor fan on the basis of the state of snow accumulation on the outdoor fan during the fan intermittent operation detected by the sensor, cause the outdoor fan to continue running.

5. The air-conditioning apparatus of claim 4, wherein the sensor is configured to detect any one of consumption power of the outdoor fan when the outdoor fan is running, current flowing in the outdoor fan, and voltage applied to the outdoor fan.

6. The air-conditioning apparatus of claim 5, wherein the controller is configured to, in a case where any one of the consumption power of the outdoor fan, the current flowing in the outdoor fan, and the voltage applied to the outdoor fan detected by the sensor is less than a threshold, cause the outdoor fan to stop.

7. The air-conditioning apparatus of claim 6, wherein the threshold is set depending on a rotation frequency of the outdoor fan.

8. The air-conditioning apparatus of claim 6, wherein the threshold is determined on the basis of any one of the consumption power of the outdoor fan, the current flowing in the outdoor fan, and the voltage applied to the outdoor fan detected by the sensor during an operation of the compressor.

* * * * *